United States Patent [19]

Olechowski et al.

[11] Patent Number: 4,751,025

[45] Date of Patent: Jun. 14, 1988

[54] ROSIN ESTER MODIFIED WITH UNSATURATED CARBOXYLIC ACID FUNCTION

[75] Inventors: Jerome R. Olechowski; Charles R. Frihart, both of Lawrenceville, N.J.

[73] Assignee: Union Camp Corporation, Wayne, N.J.

[21] Appl. No.: 910,658

[22] Filed: Sep. 23, 1986

[51] Int. Cl.⁴ ............................ C09F 1/04; C09F 5/08; C09F 7/00

[52] U.S. Cl. .................................... 260/104; 260/97; 260/101

[58] Field of Search .......................... 260/104, 101, 97

[56] References Cited

U.S. PATENT DOCUMENTS 3,317,445  5/1967  Halbrook et al. .................... 260/104

Primary Examiner—Harold D. Anderson
Attorney, Agent, or Firm—Kane, Dalsimer, Sullivan, Kurucz, Levy, Eisele and Richard

[57] ABSTRACT

Diels-Alder adducts of the polyol esters of rosin are prepared by reaction with alpha, beta-unsaturated carboxylic acids, their esters, and anhydrides.

5 Claims, No Drawings

ROSIN ESTER MODIFIED WITH UNSATURATED CARBOXYLIC ACID FUNCTION

BACKGROUND OF THE INVENTION

1. Field of the Invention

The invention relates to modified polyol esters of rosin and more particularly relates to Diels-Alder adducts of esters of rosin.

2. Brief Description of the Prior Art

It is well known that gum or wood rosin may be readily reacted with alpha, beta-unsaturated carboxylic acids to obtain the corresponding Diels-Alder adducts; see for example U.S. Pat. Nos. 3,291,785 and 3,562,243.

It is also well known that tall oil rosins may be esterified by reaction with polyols; see for example U.S. Pat. No. 3,780,012.

Other U.S. patents representative of descriptions of modified rosins are the U.S. Pat. Nos. 2,532,120; 2,563,871; 2,973,332; and 3,106,550.

Little is known about resins made by first preparing a rosin polyol ester of low residual acid number and then reacting this ester with a dienophile under Diel-Alder reaction conditions to obtain a simple adduct of the ester. One resin is this class is the highly modified ethylene glycol ester reported in Polish Pat. No. 124,426. This material is not claimed to be a pure Diels-Alder adduct. It contains about 2–4 moles of maleic anhydride per mole of rosin diene (reactive abietic-types), added in the presence of phosphoric acid catalyst.

It is clear from these prior art descriptions that the usual method of preparing "maleic-modified rosin esters" is to simply heat a mixture of maleic anhydride, polyol, and rosin until the desired acid number is achieved. Because considerable reaction between the polyol and the maleic carboxylic acid groups results in extensive esterification prior to esterification of the relatively unreactive rosin carboxylic acid group, this method affords a resin of high molecular weight and very broad molecular weight distribution. This type of resin is not always desired. The process of the present invention is an improvement in the preparation of rosin resins of low molecular weight and narrow molecular weight distribution containing intact the residual functionality of the dienophile used to modify the rosin ester.

SUMMARY OF THE INVENTION

The invention comprises a process, which comprises;

(a) preparing a polyol ester of rosin to an acid number less than 30 and, (b) adducting to this ester under Diels-Alder reaction conditions 0.1 to 1.0 moles per mole of reactive abietic-types moieties present in the ester of an alpha-beta-unsaturated acid, ester, or anhydride or alkyl half ester thereof.

The invention also comprises the Diels-Alder adduct prepared by the process of the invention.

The adducts of the invention are useful as tackifiers in adhesive elastomer compositions and as resins in solvent and aqueous ink formulations.

DETAILED DESCRIPTION OF THE PREFERRED EMBODIMENTS OF THE INVENTION

Polyol esters of the tall oil rosins are well known compositions as are methods of their preparation; see for example the U.S. Pat. No. 3,780,012.

The procedure for esterifying tall oil rosins with polyols is also well known and details need not be recited herein. In general, at least equivalent molar proportions of the tall oil rosin and the polyol and preferably one molar equivalent of rosin and a 10% molar excess of polyol are mixed together and heated to a temperature of from about 200° C. to 300° C. The esterification may be catalyzed by the presence of an alkali metal hydroxide such as calcium hydroxide. A catalytic proportion of alkali metal hydroxide may be within the range of from about 0.001 to 5.0 weight percent based on the rosin reactant. The esterification is generally complete in from 1 to 8 hours during which time about a molar equivalent of water distills out of the reaction mass and the acid number of the product ester falls to less than 30. Water removal can be aided by application of vacuum. Esterification may be followed by conventional analytical technique to observe the appearance of ester bonds. Upon the completion of the esterification, the desired ester may be separated from the reaction mixture by conventional technique such as by distillation of excess polyol and un-reacted rosins.

A wide range of polyols may be employed in the esterification to obtain the corresponding esters. Representative of polyols used to obtain useful esters are ethylene glycol, glycerol, pentaerythritol and the like.

Esters of other rosins, i.e.; gum rosins may also be used in the process of the present invention.

Those skilled in the art will appreciate that rosins and derived rosin esters and heterogeneous mixtures of varied compositions. Accordingly, in the adducts of the invention, the extent of Diels-Alder adduction will vary somewhat depending on the total abietic-type rosin groups present in the starting rosin ester and, ultimately, in the parent rosin from which the ester is derived. Only abietic-type rosin groups react in a Diels-Alder manner.

The literature indicates that gum rosin, which is obtained from the distillation of pine gum, contains 57 to 60% of abietic-type acids. Initially about 30% of the pine gum is levopimaric, but the said levopimaric acid, because it is sensitive to heat and acids, isomerizes to other abietic-type acids during the distillation of the turpentine from the gum. The levopimaric acid isomerizes so readily it cannot be detected in the distilled rosin.

The abietic-type acids are present in gum rosin in approximately the percentages indicated below:
Abietic acid—21
Neoabietic acid—19
Palustric acid—24

Tall oil rosin, obtained by the distillation of tall oil, typically contains 90–95 percent rosin acids of which 30–40 percent are abietic acid, 5 percent are neoabietic acid, 10–15 percent are palustric acid and 20–30 percent are dehydrobietic acid. The remainder are pimaric and isopimaric acids, about 10–20%, and unidentified minor acid isomers, 5–10%.

The alpha, beta-unsaturated carboxylic acids, esters, and anhydrides, and their half-esters are also well known compounds, prepared by well known methods. The acids may be mono- or polycarboxylic acids. Representative of such acids are alpha, beta-unsaturated mono-carboxylic acids such as acrylic acid and methacrylic acid, crotonic acid; alpha, beta-unsaturated polycarboxylic acids such as fumaric acid, maleic acid, citraconic acid, mesaconic acid, aconitic acid and itaconic acid; the available anhydrides of the above acids, such as maleic anhydride; alkyl esters and half-esters of the above acids, wherein the alkyl group is typically methyl or ethyl such as methyl acrylate, ethyl acrylate, monomethyl fumarate, dimethyl fumarate, diethyl fumarate, methylethyl fumarate; and mixtures thereof.

According to the method of the invention, the alpha, beta-carbonyl compounds are adducted with the rosin polyol esters under Diels-Alder reaction conditions. This reaction may be carried out by bringing the ester and from 0.1 to 1.0 moles of dienophile together and heating the reaction mixture to a temperature within the range of from about 150° C. to 300° C.; preferably 180° C. to 260° C.; most preferably 200° C. to 240° C. The correct molar proportion of dienophile is calculated on the basis of the amount of reactable abietic-types present in the ester.

Preferably, the rosin reactant is pre-heated to the reaction temperature and the alpha, beta-carbonyl compound is added incrementally to the reaction mixture.

Advantageously, the Diels-Alder reaction is carried out under an inert gas atmosphere, such as a nitrogen gas atmosphere.

The pressures employed to carry out the adduction may be atmospheric, sub-atmospheric or super-atmospheric.

The adduction is advantageously carried out in the presence of a polymerization inhibiting proportion of an inhibitor of the polymerization of the reactants. Representative of such inhibitors are hydroquinone. An inhibiting proportion may be within the range of from about 100 to about 300 per million parts of rosin ester.

Adduct acids prepared by the process of the invention are readily water-dispersable. This property is particularly useful for preparing aqueous inks, coatings, and adhesives using these adducts. In contrast, materials prepared using the inverse process, that is, almost complete esterification of the Diels-Alder adduct of an alpha, beta unsaturated acid with rosin are gel-like products and not water-dispersable. We think this difference is explained by the formation in this case of cross-linked polyesters and other high molecular weight species.

The following examples describe the manner and process of making and using the invention and set forth the best mode contemplated by the inventor for carrying out the invention but is not to be construed as limiting. Unless otherwise specified, the parts and percentages are by weight.

EXAMPLE 1

A pentaerythritol ester of tall oil rosin, with an acid number=10 mg/g, was charged to a reactor equipped with a stirrer, dropping funnel, inert gas inlet, thermometer, air-cooled condensor, and water trap topped with a water-cooled condensor. The rosin ester was heated under a slow current of nitrogen to 240° C. and held at that temperature for 30 minutes. Stirring was commenced when all the rosin ester had melted. After 30 minutes, addition of acrylic acid was begun. The acid was added through a dropping tube placed below the surface of the molten rosin ester. The rate of addition was such that little or no refluxing of the volatile acid occurred. The time required for reaction depended on the level of abietic-type acids present in the starting rosin esters and on an amount of acrylic acid used. After all the acrylic acid was added, the mixture is stirred for an additional two hours, cooled to approximately 200° C. under nitrogen, and poured out. The adduct product was then tested for acid number, softening point and color (Gardner Color in toluene; 50/50). The test results are given in the Table, below.

EXAMPLE 2

The procedure of Example 1, supra., was repeated except that the pentaerythritol tall oil rosin ester as used therein was replaced with an equal proportion of the glycerol ester of tall oil rosin. The test results are also given in the Table, below.

TABLE

| | Starting Esters | | Acrylic Modified Esters | |
| --- | --- | --- | --- | --- |
| | Glycerol | Penta-erythritol | Example 1 | Example 2 |
| Softening Point | 85° C. | 98° C. | 104.5° C. | 124.5° C. |
| Gardner No. (50/50 Toluene) | 4 | 7 | 5 | 6 |
| Acid No. | 10 | 10 | 61.8 | 47.5 |

EXAMPLE 3

The procedure of Example 1, supra., was repeated except that the tall oil rosin ester as used therein was replaced with an equal proportion of the glycerol ester of gum rosin. The adduct had a softening point of 125° C. and an acid number of 68.

EXAMPLE 4

A glycerol ester of tall oil rosin was prepared in the usual way. After the acid number had reached a value of less than 10 mg KOH per gram of sample, the ester was cooled to 200° C. and sufficient maleic anhydride was added to react with all of the abietic-type acids present. After all the maleic anhydride was added, the mixture was stirred for an additional four hours, cooled to approximately 160° C., and poured out. The resultant adduct showed a softening point of 117° C. The original glycerol ester showed a softening point of 86° C.

What is claimed is:

1. A process, which comprises;
    (a) preparing a polyol ester of a compound consisting essentially of rosin said ester having an acid number of less than 30; and
    (b) adducting to this ester under Diels-Alder conditions 0.1 to 1.0 moles of reactive abietic rosin moieties in the ester of an alpha-beta-unsaturated carboxylic acid, ester, or anhydride or dicarboxylic acid half-ester.
2. The Diels-Alder adduct product of the process of claim 1.
3. The product of claim 2 wherein the polyol is glycerol.
4. The product of claim 2 wherein the polyol is pentaerythritol.
5. The product of a process which comprises;
    (a) preparing a glycerol or pentaerythritol ester of a compound consisting essentially of rosin said ester having an acid number of less than 30 and,
    (b) adducting to this ester 0.1 to 1.0 moles of acrylic acid per mole of reactive abietic rosin moieties in the ester under Diels-Alder conditions.

* * * * *